United States Patent [19]

Vanderburg

[11] 4,434,967

[45] Mar. 6, 1984

[54] VALVE SELF-RELIEVING SEATS

[75] Inventor: Ralph W. Vanderburg, Longview, Tex.

[73] Assignee: Axelson, Inc., Longview, Tex.

[21] Appl. No.: 410,304

[22] Filed: Aug. 23, 1982

[51] Int. Cl.$^3$ .............................................. F16K 3/00
[52] U.S. Cl. .................................. 251/328; 251/172; 251/327
[58] Field of Search ...................... 251/172, 328, 327

[56] References Cited

U.S. PATENT DOCUMENTS

| | | | |
|---|---|---|---|
| 3,006,601 | 10/1961 | Anderson | 251/328 X |
| 3,307,826 | 3/1967 | Lowrey | 251/328 X |
| 3,765,440 | 10/1973 | Grove | 251/328 X |
| 3,834,664 | 9/1974 | Atkinson | 251/328 X |

Primary Examiner—Harold W. Weakley

[57] ABSTRACT

A gate valve having an inlet and an outlet flow-way with a chamber having a gate inbetween and with counterbores at the end of the flow way adjacent the chamber is disclosed. Each counterbore telescopically receives a seat member. A sealing system for each of the gate seat members which permit certain liquid communication to the valve body cavity is disclosed. Each seal system includes seals on all sides of the gate seat member except the inwardly facing cylindrical walls. Each seal is disposed on an annular groove cut in the outer periphery surface of the end of the gate seat member. The seal on the upstream side of the valve body is located adjacent to the inwardly facing cylindrical wall. The seal between the gate seat and the gate is located near the valve body cavity. The seal on the outwardly facing cylindrical wall is adjacent to the valve body flow-way counterbores.

16 Claims, 7 Drawing Figures

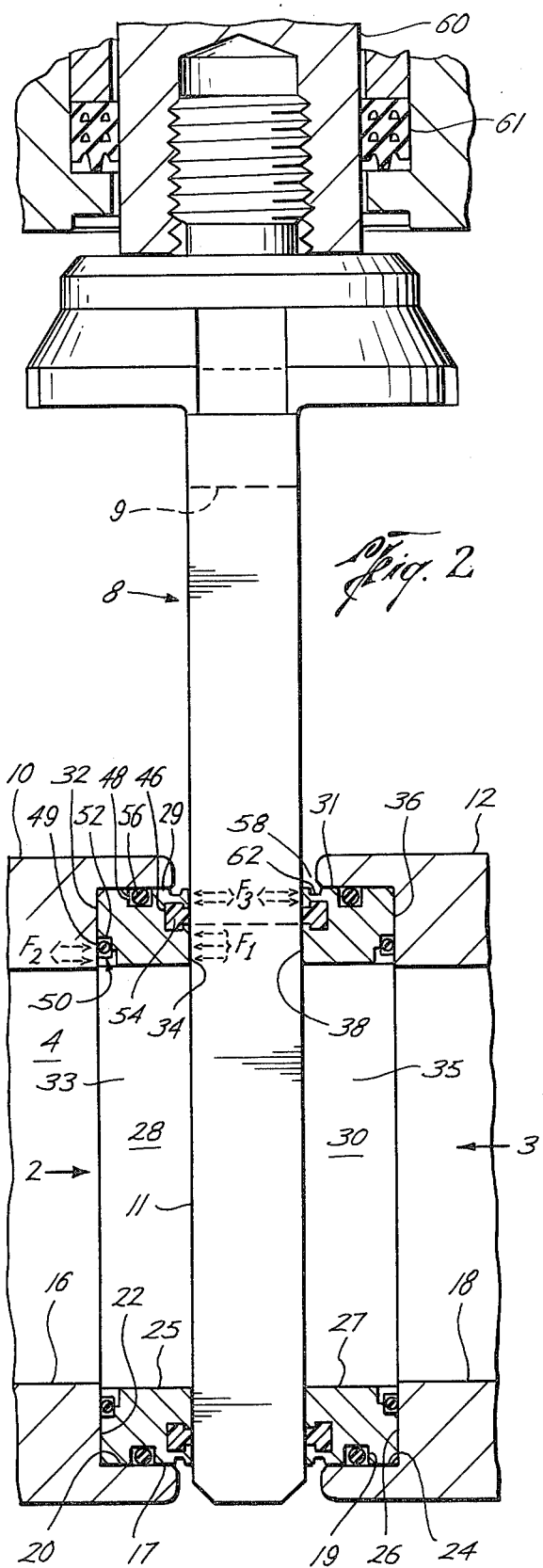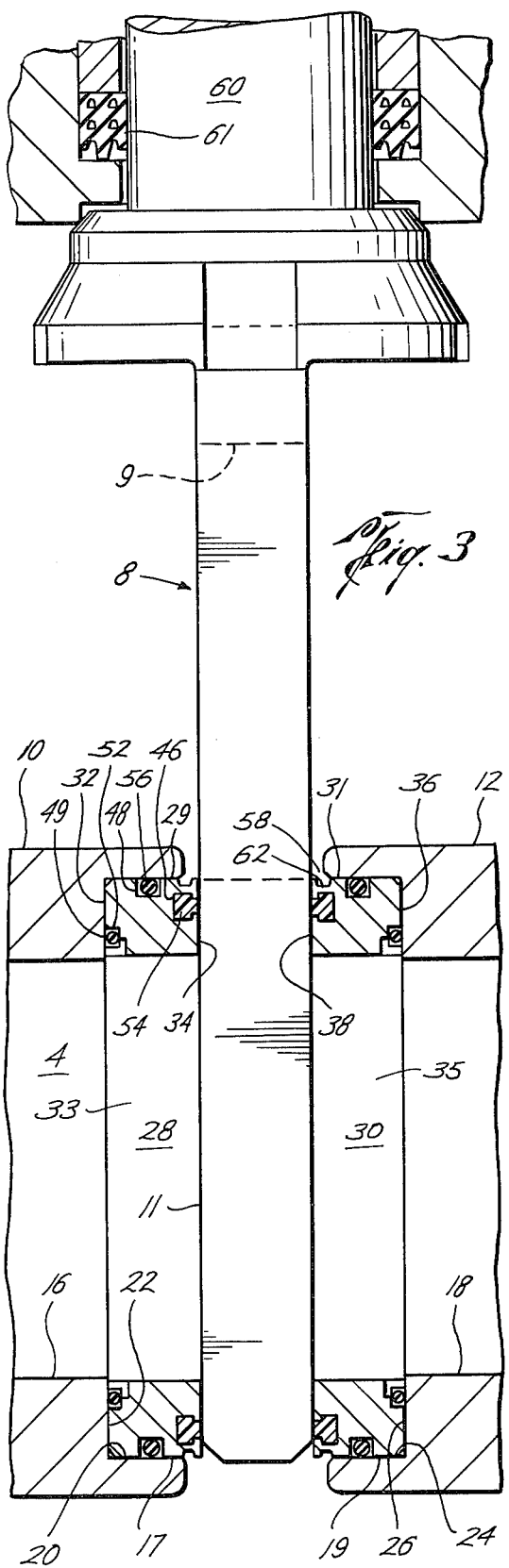

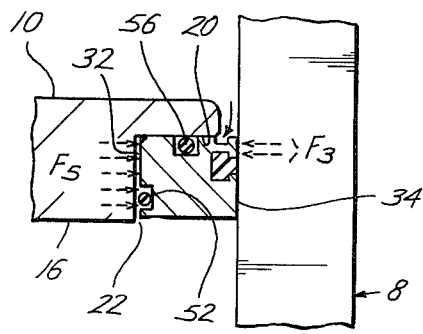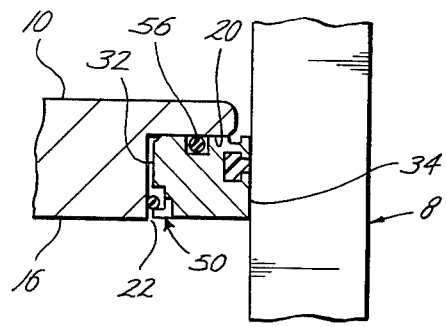
*Fig. 4* *Fig. 5*
*Fig. 6*
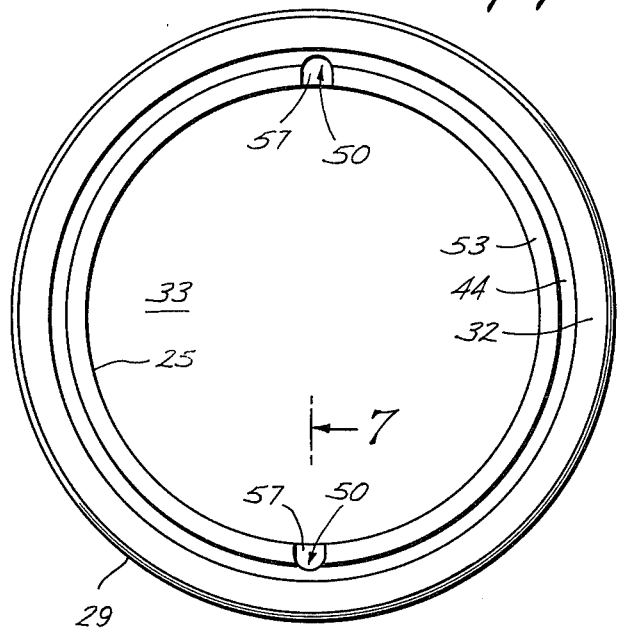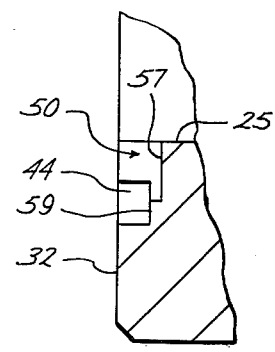
*Fig. 7*

VALVE SELF-RELIEVING SEATS

TECHNICAL FIELD

The invention relates generally to seats for gate valves. More specifically, it relates to seats that permit line fluid pressure (liquid or gas) to force the gate into a closed position.

BACKGROUND ART

Gate valves have been used for many years to prevent and permit the flow of fluids, such as oil, in pipelines. With today's stringent safety requirements, many of these gate valves contain fail-safe mechanisms so that the valve will close should actuator problems occur. A fail-safe type valve is one that must close automatically at a predetermined minimum line pressure without the aid of a spring. See for example U.S. Pat. No. 3,765,642, issued Oct. 16, 1973, to Norman A. Nelson; U.S. Pat. No. Re. 30,115, reissued Oct. 16, 1979 to David P. Herd, et al; U.S. Pat. No. 3,378,224, issued Apr. 16, 1968 to W. G. Boyle; U.S. Pat. No. 3,379,405, issued Apr. 23, 1968 to P. J. Natho and U.S. Pat. No. 3,958,592, issued May 25, 1976 to Richard E. Wells, et al.

For a gate valve to be fail-safe at any given line pressure, there usually exists a means of communicating line pressure into the valve body cavity. Pressure within the body cavity will then act upon the area of the valve shaft and produce an upward (closing) force greater than the friction forces developed between the gate and seats. However, many gate valves known in the prior art are directed to include upstream seats which are effective to exclude line pressure from the valve housing during normal operation. In addition, many of these also are directed to relieving valve housing pressure when it becomes excessive by bleeding the fluid in the valve housing back into the line. See for example U.S. Pat. No. 2,985,189, issued May 23, 1961 to S. R. Dickinson; U.S. Pat. No. 2,985,422, issued May 23, 1961 to C. E. Anderson, et al; U.S. Pat. No. 3,307,826, issued May 7, 1967 to W. E. Lowrey; U.S. Pat. No. 3,559,948, issued Feb. 2, 1971 to Marvin H. Grove; U.S. Pat. No. 3,834,664, issued Sept. 10, 1974 to Eulas R. Atkinson; and U.S. Pat. No. 4,161,309, issued July 17, 1979 to Thomas A. Klyce. For example, Dickinson disclosed a venting system for a valve body wherein the sealing ring is positioned in an annular groove having a varying cross-sectional area. This permits the sealing ring to move to a position to permit leakage of fluid from the valve body to the conduit. Klyce shows a gate valve in which upstream pressure is continuously applied across a seat ring to a valve housing by expansion of an o-ring on the upstream seat to a non-sealing position.

Some of the prior art uses a design which works with flowing gas, or when there is at least a small percentage of gas present within the flowing medium or fluid. In some of the prior art, with gas as the flowing medium or with a small percentage of gas present, the gate will move (i) from an open position to a position wherein pressure communication between the body cavity and the upstream side is lost prior to the gate fully closing and (ii) will continue to move from the position of (i) to a fully closed position by the expansion of the gas within the valve body cavity. However, when the flowing medium is only liquid, the valve would remain in a semi-closed position without the aid of a spring or other mechanism because of the incompressibility of liquids. Accordingly, insufficient force would be produced to overcome the friction between the gate and the seats to fully close the valve.

It is an object of the present invention to teach an apparatus that renders a gate valve fail-safe for liquids or gases even in the absence of the aid of a spring.

It is a further object of the present invention to teach apparatus to render a gate valve in liquid or gas service fail-safe without the aid of a spring while retaining a bidirectional design.

It is yet another object of the present invention to teach apparatus which renders a gate valve in liquid or gas service fail-safe without the aid of a spring while avoiding a pressure lock situation.

DISCLOSURE OF THE INVENTION

A gate valve and apparatus for rendering the gate valve fail-safe in liquid or gas service without the aid of a spring while retaining bidirectional design and avoiding pressure lock is disclosed. The valve includes a gate seat with a sealing system having three seals, each seal positioned on a side of the seat cross section, except the side facing the flowing medium. The seals are positioned such that a balance of forces is created about the seat permitting upstream liquid or gas to pass between, for example, the seat face and the gate. The pressure within the valve body cavity then acts upon the shaft area and produces an upward closing force equal to the pressure of the flowing liquid multiplied by the area of the shaft. In this manner, liquid under pressure will continue to flow into the valve cavity resulting in body cavity pressure to be equal to upstream line pressure.

At least one, and preferably both, of the gate seals also includes at least one notch to permit liquid under pressure in the valve cavity to bleed back to the line pressure should seal become damaged.

BRIEF DESCRIPTION OF THE DRAWINGS

For a further understanding of the nature and objects of the present invention, reference is made to the following drawing in which like parts are given like reference numerals, and wherein:

FIG. 2 is a vertical section through the body of a gate valve showing the seats of the preferred embodiment of the present invention with the valve in a partially closed position;

FIG. 3 is a vertical section through the body of a gate valve showing the seats of the preferred embodiment of the present invention with the gate in the fully closed position;

FIG. 4 is an enlarged fragmentary section of a sealing structure between a gate and valve body of a gate valve which is not preferred;

FIG. 5 is an enlarged fragmentary section of the sealing structure of FIG. 2 showing the seat sealing system of the preferred embodiment of the present invention.

FIG. 6 is an end view of the seat showing the seal groove and notches; and

FIG. 7 is an enlarged fragmentary section of the seal groove of FIG. 6 along section lines 7—7 showing one of the notches.

PREFERRED MODE FOR CARRYING OUT THE INVENTION

Figure 1:
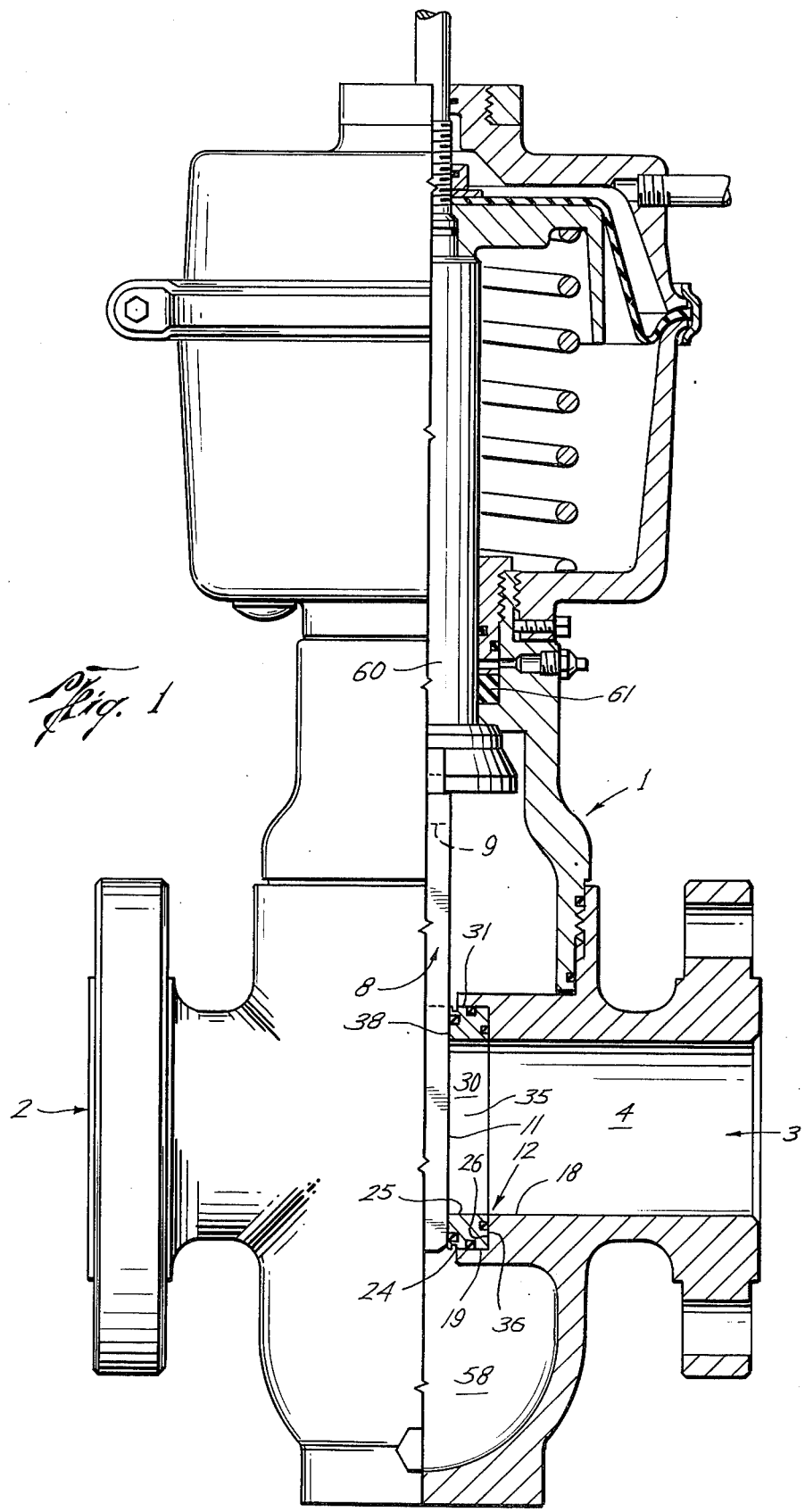
FIG. 1 is a vertical, partial section through a gate valve embodying the invention.

Referring to FIG. 1, there is shown a valve comprising a valve housing or body 1 having enclosed flow ports 2,3 either of which may be the inlet or outlet depending on the orientation of the valve in the line in which the valve is mounted. As shown in FIG. 1, the flow ports 2, 3 form the flow way 4 which is intersected interiorly of the housing 1 by a cylindrical closure or gate chamber whose major axis is generally at right angles to the flow way 4. A gate 8 is provided in the chamber. The gate 8 is provided near its upper end with a transverse flow port 9. The lower end of gate 8 is provided with a closure section 11 adapted to cut off flow through flow way 4. As illustrated in FIG. 1, flow port 2 is the upstream portion or inlet of the valve and flow port 3 is the downstream portion or outlet of the valve. The fluid medium flowing through the line and valve may be termed line liquid. The inner portions 10, 12 of flow ports 2, 3 respectively are provided with bores 16, 18 and coaxial counterbores 17, 19 respectively circumscribing inner portions 10, 12 of flow ports 2, 3. Coaxial counterbores 17, 19 form inwardly facing annular shoulders 22, 26 and inwardly facing cylindrical walls 20, 24 respectively. The counterbore walls 20, 24 have a larger diameter than the bores 16, 18. The closure chamber and counterbores 17, 19 are adapted to receive a pair of cylindrically shaped seat members 28, 30 respectively, with outer surfaces 29, 31 of seat members 28, 30 respectively abutting and extending beyond walls 20, 24 respectively, and inner surfaces 25, 27 forming transverse openings 33, 35 coaxial and in register with bores 16, 18. As gate seat members 28, 30 and their details are identical in construction and are arranged symmetrically on opposite sides of the closure chamber, the description of one will be applicable to both where both are not disclosed.

The gate seat members 28, 30 are circular in form, having inwardly facing surfaces 34, 38 respectively shaped to cooperate in sliding engagement with the abutting face of gate 8, and outwardly facing surfaces 32, 36 respectively shaped to be substantially complimentary to inwardly facing annular shoulders 22, 26 respectively. Flow port 9 is adapted to register with openings 33, 35 in seat members 28, 30 when the gate 8 is in the lowered or flow way opening position.

Gate 8 is disposed in the closure chamber for vertical reciprocation across the flow-way 4 between the gate seats 28, 30.

It should be understood that the valve shown in FIG. 1 is a safety valve with flow port 9 above the closure section 11. In preferable use with conventional remote actuation, the valve will generally be closed to fluid flow without remote actuation. This would also be used in the fail-safe situation. However, flow port 9 could be located below section 11 acting whereby during service without remote actuation, the valve would generally be in the open position and the seat seal mechanism shown would still operate properly.

Grooves 44, 46 and 48 are formed in sides 32, 34, 29 respectively of seat 28. Groove 44 is also provided with dual, opposing safety notches 50. (FIGS. 5-7) formed on the inner periphery surface 25 of seat 28, 30. Notches 50 are formed between groove 44 and surface 25 by cutting square grooves in the wall 53 formed between surface 25 and groove 44. The bottoms 57 of the grooves and a contiguous portion of the bottoms 59 of grooves 44 are compressed to force them slightly below the rest of the bottoms 59 of grooves 44 to form a recess. The shape of the compressed surface is that of a truncated circle. It should be noted that the recess is not necessary but preferable. Each of grooves 44, 46, 48 (FIG. 2) has a seal ring 52, 54, 56 respectively, preferably of rubber for rings 52, 56 and nylon for ring 54 or other sealant material, in the groove. Groove 44 is located at the end of surface 32 adjacent to transverse opening 33. Groove 46 (FIG. 2) is located on surface 34 such that the surface area between the edge of transverse opening 33 and the sealing portion of seal 54 is greater than the surface area between the sealing portion of seal 52 and the edge of transverse opening 33. Groove 48 is positioned on surface 29 such that when seat 28 fits into the counterbore, groove 48 is adjacent the inwardly facing cylindrical wall 20 of the counterbore. The same structure would be formed in seat 30, preferably, so that the valve may be bi-directional in design. Groove 62 is also formed in each of the seats 28, 30 to accomodate a wrench for manipulating the seats 28, 30.

The gate 8 and seats 28, 30 are housed in cavity 58 (FIG. 1) of body 1. Gate 8 is connected to stem 60 which reciprocates through stem seal packing 61.

In FIG. 2, the flow of fluid is indicated by the arrow P1 designating flow as disclosed above. The force lines F1 in FIG. 2 indicate the force exerted by the liquid on the surface 34 between the edge of transverse opening 33 and the edge of seal 54. The force lines F2 indicate the force exerted by the liquid on surface 32 between the edge of transverse opening 33 and the edge of seal 52. The force lines F3 indicate the forces on surface 34 and surface 38 between the edge of seal 54 and its corresponding seal on seat 30 and the outer edge of surface 34 and surface 38 respectively. The force lines F5 indicate the forces on surface 32 as shown in FIG. 4.

In operation, as the valve gate 8 reaches the position in FIG. 2 where the flow through flow way 4 is cut off by closure section 11, the seat 28 is pushed away from gate 8. This is caused by the force illustrated by F1 being greater than the force illustrated by F2. This separation allows line pressure and liquid to pass between seat face 34 and gate 8 to cavity 58. Seal 56 prevents liquid in cavity 58 from flowing across surface 32 to negate the ratio which produces the force illustrated by F1 greater than the force illustrated by F2. The pressure within the valve body cavity 58 then acts upon the shaft area and produces an upward (closing) force equal to the pressure of the upstream fluid multiplied by the area of the shaft. So long as the pressure in the upstream medium is transmitted into body cavity and is greater than friction within the valve, gate 8 will move from the partially closed position shown in FIG. 2 wherein the gate center line is lower than the bore center line to a position wherein the gate and bore center lines are approximately coincident as shown in FIG. 3.

As the valve opens, gate 8 moves into the position where the flow port 9 in gate 8 comes in register with bores 16, 18 of the valve body 1 and transverse openings 33, 35 of the seats 28, 30. As the valve opens, a force illustrated by F3 pushes the upstream seat 28 away from gate 8. This allows the fluid in body cavity 58 to be displaced past the gate to relieve the pressure between the upstream seat face 34 and the gate 8. Seal 56 prevents pressure lock within the body cavity 58 as the stem 60 moves downward (valve opening) through the packing 61. Without seal 56 or should it be faulty, fluid in body cavity 58 would flow across surface 32 allowing pressure build-up on surface 32. Such pressure would force surface 34 against gate 8. As seen in FIG. 4, seal 52 would aid in such pressure build-up, acting to produce a force indicated by F5 across the entire surface 32 of FIG. 3, thereby preventing fluid in body cavity 58 from discharging from body cavity 58 as the stem moves downward. The force illustrated by F5 would be greater than the force illustrated by F3 shown in FIG. 4 and push the seat 28 against the gate 8. Accordingly, should seal 56 fail or be faulty and cause pressure lock, the shaft force produced by the actuator would compress the contained fluid in cavity 58 creating pressure which could severely damage the valve.

To prevent pressure lock described in the preceding paragraph within the body cavity 58 should the upstream seal 56 become damaged, notches 50, 51 are provided. Notches 50, 51 are located and shaped such that they do not interfere with the o-ring sealing pressure from within the upstream valve body conduit. However, when pressure occurs in the valve body cavity 58 greater than the pressure of the upstream liquid which could happen only if seal 56 were to fail or to become damaged, seal 52, which is preferably an o-ring, would permit liquid to flow around it into notches 50, 51 by the pressure originating from cavity 58 causing a leak path between seal 52 and shoulder 22. This leak path allows the stem 60 to displace fluid from the body cavity 58 as it moves downward through stem seal 61.

In contrast to the present invention, the prior art does not have a seal on surface 32. Accordingly the force illustrated by F5 acting on surface 32 is greater than the force illustrated by F1 in the prior art because the force of the upstream liquid acts across the entire surface 32. Accordingly, in the prior art, the seat is pushed against the gate to form a seal between the seat face and the gate face. Therefore, communication of liquid, and pressure, into the body cavity 58 is lost at the position shown in FIG. 2 which occurs prior to the gate 8 fully closing. Therefore in the prior art, there is a loss of communication of line pressure into the body cavity 58. Accordingly, with incompressible liquids as the flowing medium, there is no means in the prior art of producing a force from the liquid on the stem area sufficient to close the gate 8 fully. Accordingly, when the flowing medium is a liquid, the prior art would have gate 8 remain in the position of FIG. 2 if a spring or other mechanism is not employed to help close the gate or if such spring mechanism is defective and thereby prevent metal to metal seal between stem and bonnet (fire seal).

Beside the preferred valve embodiment, the seat mechanism described above can be used with any gate valve wherein the gate mechanism is permitted to close or open automatically at a predetermined line pressure without the aid of a spring or other mechanism. See, for example, the valves of U.S. patent application Ser. No. 235,102, filed Feb. 17, 1981 by David E. Snyder, et al for Heat Sensitive Motor Valve Jack; U.S. patent application Ser. No. 148,385, filed May 9, 1980, now U.S. Pat. No. 4,354,425, by Billy R. Bruton, et al for Fire-Safe Valve Actuator; and U.S. patent application Ser. No. 171,372, filed July 23, 1980, now abandoned, by Billy R. Bruton, et al for Heat-Sensitive Valve.

Because many varying and different emodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A valve for use with fluids under pressure, comprising:
   a valve body having an inlet and an outlet with a chamber therebetween;
   a seat located in said valve body;
   a closure member in said chamber having flow means for cooperating with said seat for preventing fluid flow in the closed position and for permitting fluid flow in the open position;
   moving means for moving said closure member from said closed position of preventing fluid flow to said open position of permitting fluid flow, said moving means including means for permitting the fluid pressure to move said closure member to said closed position; and
   seal means for providing sealing engagement between said seat and said valve body and between said seat and said closure member, said seal means including leak means for permitting flow of fluid only in the direction from said inlet to said chamber between said closure member and said seat when said closure member is positioned near said closed position, whereby the fluid pressure urges said closure member to said closed position.

2. The valve of claim 1 wherein:
   said inlet includes a coaxial counterbore forming an inwardly facing annular shoulder and an inwardly facing cylindrical wall;
   said seat has a first surface juxtaposed to said shoulder and a second surface juxtaposed to said wall and a third surfaced juxtaposed to said closure member; and
   said leak means includes a first seal between said first surface and said shoulder and a second seal between said second surface and said wall and a third seal between said third surface and said closure member.

3. The valve of claim 2 wherein the surface area of said seat bounded between said inlet and said first seal is less than the surface area of said seat bounded between said inlet and of said seat said third seal.

4. The valve of claim 2 or 3 wherein said first seal includes:
   sealant material;
   a groove in said seat dimensioned to receive said sealant material, said groove having a first portion to retain said sealant material in sealing engagement with said shoulder and said first surface and a second portion having means for retaining said sealant material in leaking engagement with said shoulder with leaks only from said chamber to said inlet, the leaks occuring when the pressure between said first surface and said shoulder exceeds the pressure in said inlet.

5. The valve of claim 1 wherein said seal means includes second leak means responsive to positive differential pressure between (i) fluid between said seat and said valve body and (ii) fluid in said inlet for permitting the flow of fluid from said valve chamber around said seat to said inlet when said closure member is moving from said closed position to said open position.

6. In a seat sealing system for a valve having a valve housing, the housing including a flow bore therethrough and a pair of counterbores coaxial with the bore and with a chamber therebetween, each counterbore forming a shoulder with the bore and having an inwardly facing cylindrical wall and having at least one seat hub telescopically received in the counterbore adjacent to the wall, each seat hub having a wall forming a flow bore in register with a housing flow bore, the chamber having a gate therein, the gate including flow means for cooperating with the seat hub for preventing fluid flow in the closed position of the gate and permitting fluid flow in the open position of the gate and means for permitting fluid pressure in the housing to move the gate from the open to the closed position, a first seal means for sealingly engaging the seat with the gate, a second seal means for sealingly engaging the seat with the counterbores, the improvement comprising:

said second seal means including a first seal for sealingly engaging the seat with the shoulder and a second seal for sealingly engaging the seat with the wall.

7. The system of claim 6, wherein:

said first and second seal means have cooperative first leak means responsive to a positive differential pressure between the fluid in the flow bore and the fluid in the chamber for permitting fluid flow from the bore to the chamber between the gate and the seat, whereby the fluid pressure urges the gate from one position to the other position; and said first and second seal means have cooperative second leak means responsive to a positive differential pressure between (i) the pressure of fluid in the space between the shoulder and the seat hub and (ii) the pressure of fluid in the flow bore for permitting fluid flow from the space to the flow bore through the second seal means, whereby valve pressure lock is prevented.

8. In a seat sealing system for a valve having a valve housing, the housing including a flow bore therethrough and a pair of counterbores coaxial with the bore and with a chamber therebetween, each counterbore forming a shoulder with the bore and having an inwardly facing cylindrical wall and having at least one seat hub telescopically received in the counterbore adjacent to the wall, each seat hub having a wall forming a flow bore in register with a housing flow bore, the chamber having a gate therein, the gate including flow means for cooperating with the seat hub for preventing fluid flow in the closed position of the gate and permitting fluid flow in the open position of the gate and means for permitting fluid pressure in the housing to move the gate from the open to the closed position, a first seal means for sealingly engaging the seat with the gate, a second seal means for sealingly engaging the seat with the counterbores, the improvement comprising:

said first and said second seal means have cooperative first leak means responsive to a positive differential pressure between the fluid in the flow bore and the fluid in the chamber for permitting fluid flow from the bore to the chamber between the gate and the seat, whereby the fluid pressure urges the gate from one position to the other position; and said first and second seal means have cooperative second leak means responsive to a positive differential pressure between (i) the pressure of fluid in the space between the seat hub and the shoulder and (ii) the pressure of fluid in the flow bore for permitting fluid flow from the space to the flow bore through the second seal means, whereby valve pressure lock is prevented.

9. The system of claim 8 wherein:

said second seal means includes a first seal for sealingly engaging the seat with the shoulder and a second seal for sealingly engaging the seat with the wall.

10. The system of claims 7 or 9 wherein:

said first seal means includes a third seal for sealingly engaging the seat and the gate; and said first leak means includes said first seal being spaced closer to the seat hub flow bore than said third seal.

11. The system of any of claims 6, 7, or 9 wherein said second leak means includes:

a groove in the seat hub surface adjacent the shoulder;

said first seal mounted in said groove; and slot means cut in said groove through the wall for permitting flow from said groove to the flow bore.

12. The system of claim 11 wherein said slot means includes at least one slot.

13. The system of claim 12 wherein said slot means includes two oppositely disposed slots.

14. The system of claim 12 wherein the depth of said slot is greater than the depth of said groove.

15. A valve for use with fluids under pressure, comprising:

a valve body having an inlet and an outlet with a chamber therebetween;

two seats located in said valve body, oppositely facing across said chamber;

a closure member in said chamber having flow means for cooperating with said seat for preventing fluid flow in the closed position and for permitting fluid flow in the open position;

moving means for moving said closure member from said closed position of preventing fluid flow to said open position of permitting fluid flow, said moving means including means for permitting the fluid pressure to move said closure member to said closed position; and a seal means mounted on each of said seats for providing sealing engagement between said seat and said valve body and between said seat and said closure member, said seal means for each of said seats including leak means for permitting flow of fluid from said inlet to said chamber between said closure member and said seat when said closure member is positioned in said closed position, whereby the fluid pressure urges said closure member to said closed position in both orientations of the valve.

16. A valve for use with fluids under pressure, comprising:

a valve body having an inlet and an outlet with a chamber therebetween;

a seat located in said valve body;

a closure member in said chamber having flow means for cooperating with said seat for preventing fluid flow in the closed position and for permitting fluid flow in the open position;

moving means for moving said closure member from said closed position of preventing fluid flow to said open position of permitting fluid flow, said moving means including means for permitting the fluid pressure to move said closure member to said closed position; and seal means mounted on said seats for providing sealing engagement between said seat and said valve body and between said seat and said closure member, said seal means includes a seal on each surface of said seat which abuts and sealingly engages a surface of said valve body and a seal on said seat which abuts and sealingly engages said closure member.

* * * * *